Patented Feb. 14, 1939

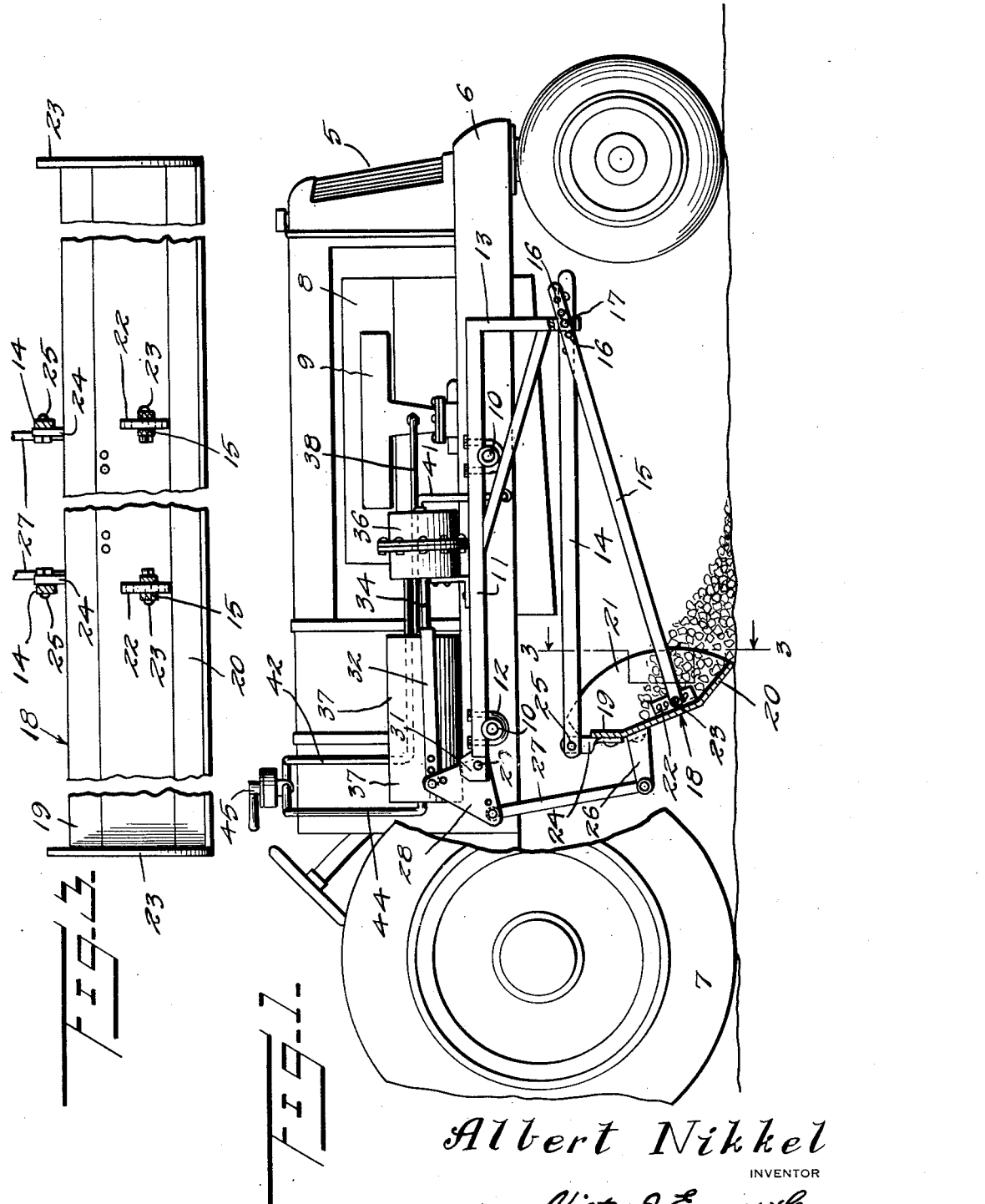

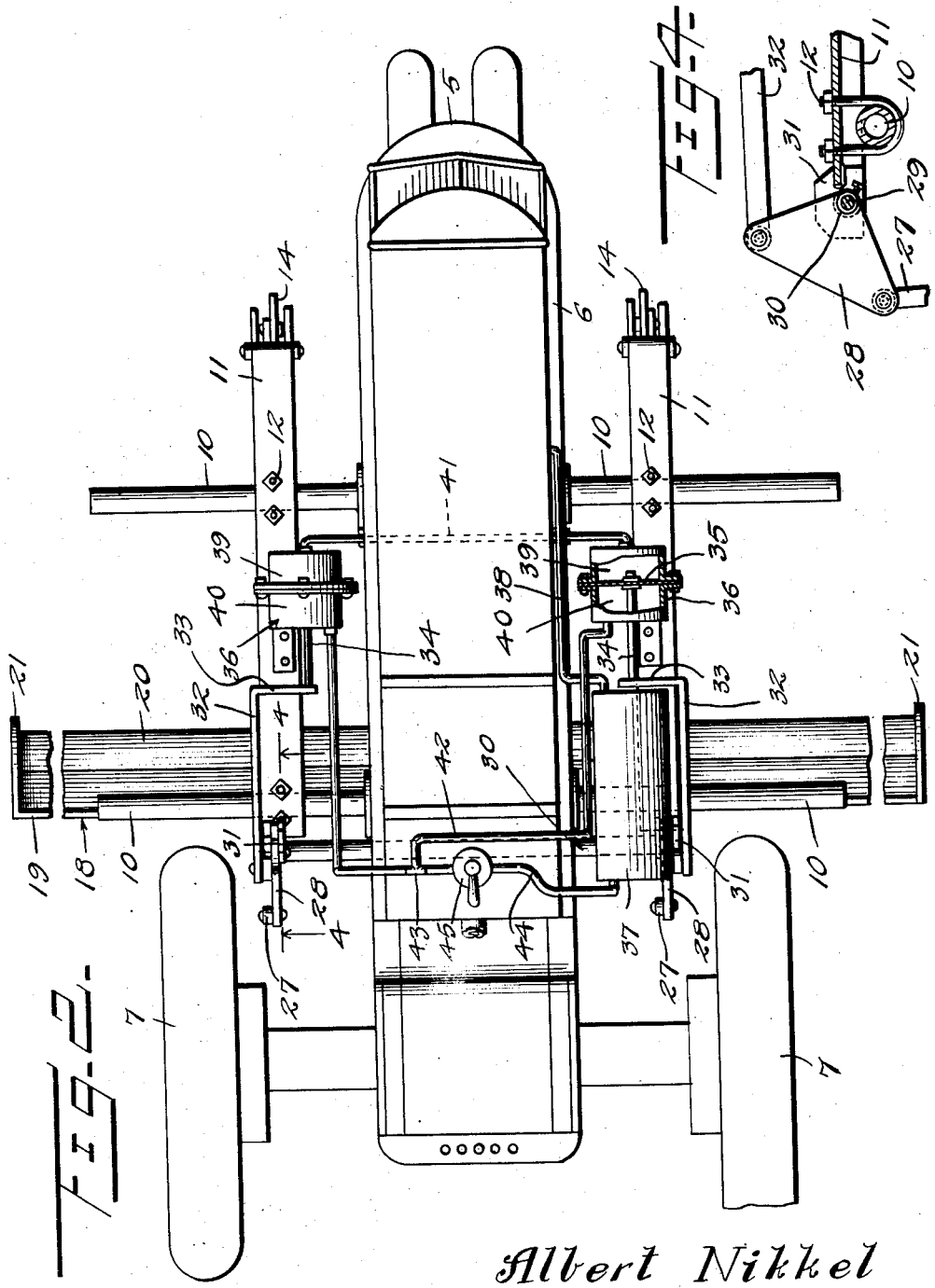

2,147,207

UNITED STATES PATENT OFFICE 2,147,207

SCRAPER

Albert Nikkel, Shafter, Calif

Application February 25, 1938, Serial No. 192,662

1 Claim. (Cl. 37—153)

My invention relates to scrapers and more particularly to scraper attachments adapted for operation in connection with tractors or other forms of motor vehicles.

One of the principal objects of my invention is to provide a scraper attachment capable of easy attachment to tractors already in use and which is simple in construction, durable in operation, efficient in use and economical in manufacture.

Another object of my invention is to provide a scraper attachment of the above described character adapted for easy attachment to a tractor and operable by a power source on said tractor whereby the scraper blade may be easily raised and lowered during working operations.

Other objects and advantages will be apparent from the following description, appended claims and annexed drawings.

Referring to the drawings wherein like reference characters designate like parts throughout the several views:

Fig. 1 is a side elevation of a conventional form of tractor illustrating my invention attached thereto.

Fig. 2 is a top plan view thereof.

Fig. 3 is a sectional view taken on the line 3—3 of Fig. 1.

Fig. 4 is a fragmentary side elevation illustrating the connecting mechanism between the scraper blade and power source.

In practicing my invention I provide a tractor 5 equipped with the usual chassis frame 6 mounted on wheels 7 and having an engine 8 provided with the usual intake manifold 9.

Secured to the chassis frame 6 and extending laterally therefrom are support members 10 on which are mounted a pair of frame members 11 by means of U bolts 12, one of said frame members being disposed on each side of the chassis frame. The forward ends of the frame members 11 extend downwardly as at 13 and have pivoted thereto pairs of upper and lower drag bars 14 and 15 respectively. The forward ends of said drag bars are provided with a plurality of apertures 16 for receiving therethrough pivot pins 17 whereby said drag bars are adjustable forwardly and rearwardly of the downwardly extending ends 13.

Secured to the rearwardly extending ends of the drag bars is a transversely extending scraper blade 18 positioned subjacent the chassis frame 6 and fashioned with upper and lower end sections 19 and 20 respectively. The scraper blade is also fashioned on the opposite ends with side walls 21 and intermediate of the upper and lower ends on the forward face thereof with flanges 22 having a plurality of openings formed therein for receiving pins 23 for adjustably connecting the rearwardly extending ends of the pairs of drag bars thereto.

The upper end 19 of the blade has secured thereto a pair of spaced brackets 24 pivotally connected to the rearwardly extending end of the drag bar 14 by means of pins 25 as clearly illustrated in Fig. 1.

Mounted on the rear face of the scraper blade 18 subjacent the brackets 24 are a pair of rearwardly extending brackets 26 pivotally connected to the lower ends of a pair of links 27, one of said links being disposed on each side of said chassis frame. The upper ends of said links 27 are connected to bell cranks 28 pivotally mounted on a shaft 29 extending transversely of the chassis frame 6 and rotatable within a bearing sleeve 30 affixed to said chassis frame by means of connecting plates 31. The bell crank levers 28 are of a substantially triangular configuration and have pivoted to a pair of corners thereof connecting rods 32 having offset sections 33 secured to the outer ends of shafts 34.

The inner ends of the shafts 34 are secured to diaphragms 35 mounted for actuation within a pair of cylinders 36, one mounted on each side of said tractor chassis 6. The diaphragms are adapted to be flexed in a manner hereinafter set forth and such flexing action serves to move the shafts 34 to cause the bell crank levers 28 in turn to raise and lower the scraper blade 18, as the case may be, through the medium of the links 27. The pairs of bars 14 and 15 serve to guide and steady the blade in the upward and downward movement thereof.

Secured on one side of the chassis frame and rearwardly of one of the cylinders 36 is a vacuum tank 37 connected by a pipe line 38 to the intake manifold 9 of the engine 8.

Each of the cylinders 36 are partitioned by means of the diaphragms 35 into front and rear chambers 39 and 40 respectively, the front chambers 39 being connected together by a pipe line 41 and the rear chambers being connected together by a pipe line 42. The pipe line 42 is likewise connected by means of a T 43 to the tank 37 by a pipe line 44 having a control valve 45 interposed therein. Said control valve is operable to one position to permit communication between the tank 37 and the pipe line 42 and in another position to effect communication between the pipe line 42 and the atmosphere. The tank 37 serves as a vacuum tank to prevent pulsation of the diaphragms 35 when the same are being actuated.

From the foregoing it will be apparent that when the control valve 45 is operated to effect communication between the tank 37 and the pipe line 42, the pressure in the chambers 40 will be reduced and as a consequence the diaphragms actuated in a direction to lower the scraper blade 18 through the medium of the connected parts. Operation of the control valve to effect communication between the pipe line 42 and the atmosphere will permit pressure in the chambers 40 to be raised to atmospheric pressure and effect a raising of the scraper blade. The pipe line 41 serves to maintain a like amount of pressure in each of the chambers 39.

While I have shown and described my invention as being operable through the medium of a power source comprising the intake manifold of an engine, it is to be understood that the same may be operated through the medium of hydraulic means without departing from the spirit of the invention or scope of the appended claim.

What I claim is:

A device of the character described, comprising, in combination with a tractor equipped with a power source, a scraper blade disposed transversely of said tractor, frames mounted on said tractor, bell cranks pivoted to the rear ends of said frames, links connecting said blade to said cranks, pairs of adjustable links connected to the forward ends of said frames, one of said pairs of adjustable links pivoted to the upper section of said blade, another pair of said links pivotally and adjustably connected to said blade intermediate of the depth thereof, and means connecting said cranks to said power source whereby to raise and lower said blade.

ALBERT NIKKEL.